Nov. 8, 1927.
L. C. ALBRECHT
1,648,796
REVERSIBLE VENTILATION
Filed May 20, 1926
2 Sheets-Sheet 2
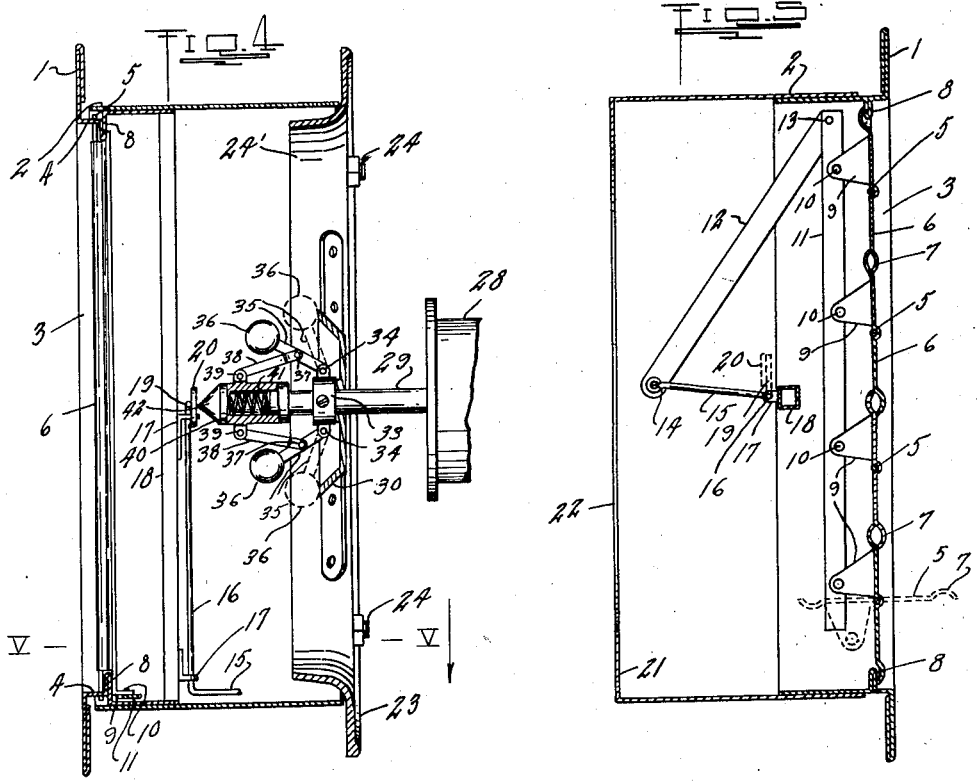
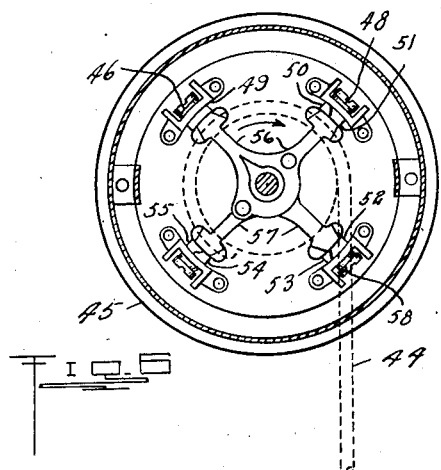
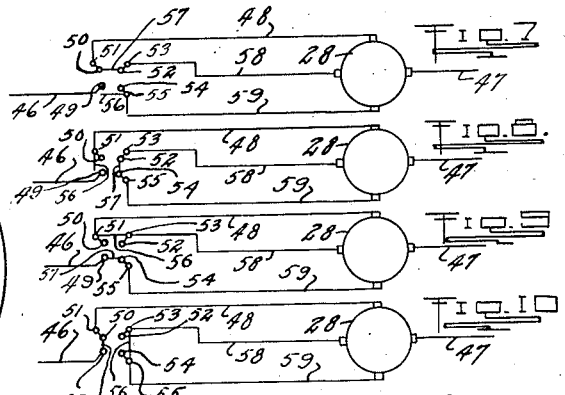
Inventor
Louis C. Albrecht
By
Geo E Kirk
Attorney Patented Nov. 8, 1927.

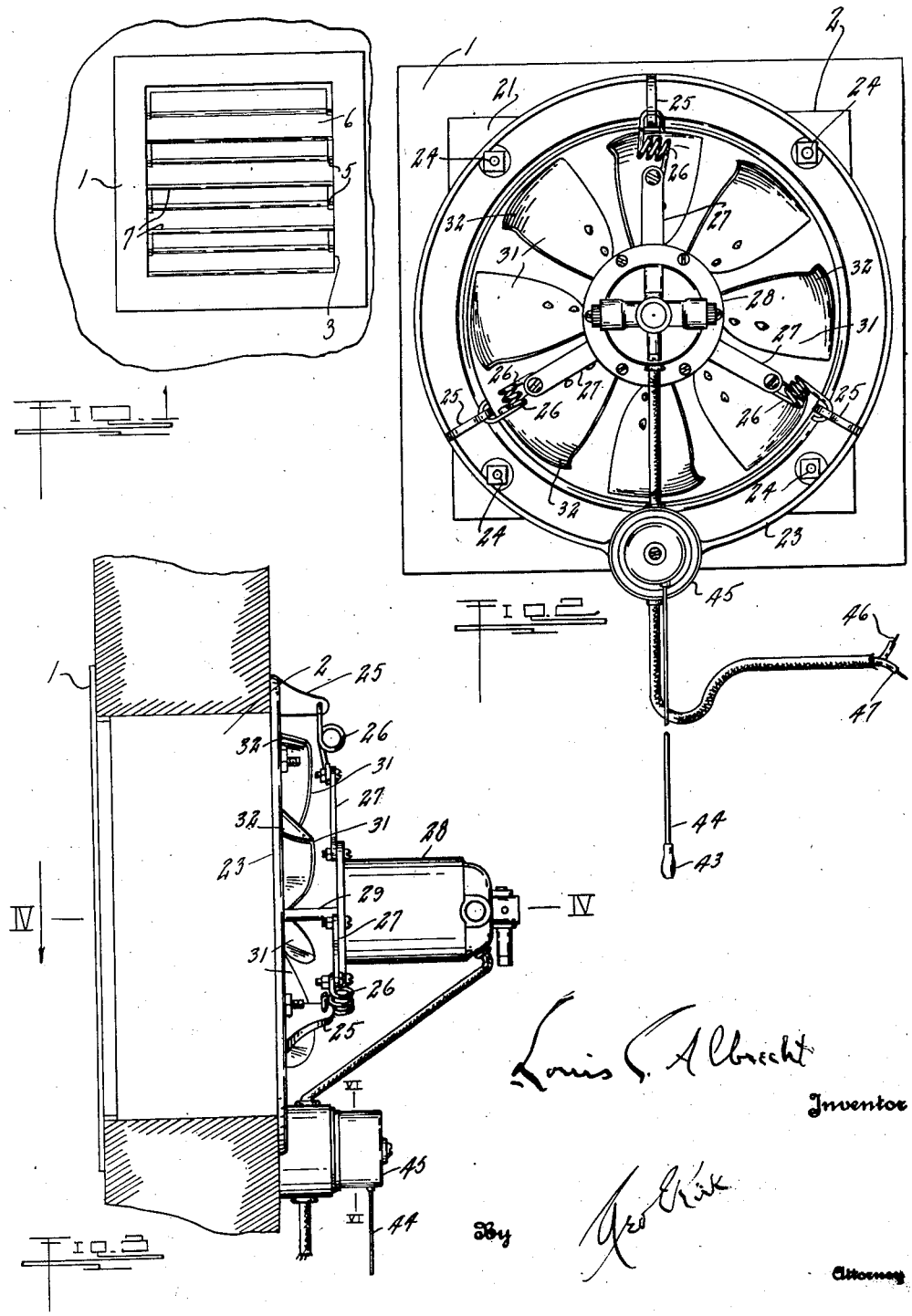

1,648,796

UNITED STATES PATENT OFFICE.

LOUIS C. ALBRECHT, OF TOLEDO, OHIO, ASSIGNOR TO THE AMERICAN WARMING & VENTILATING COMPANY, OF TOLEDO, OHIO, A CORPORATION OF OHIO.

REVERSIBLE VENTILATION.

Application filed May 20, 1926. Serial No. 110,435.

This invention relates to controllable ventilation mechanism.

This invention has utility when incorporated in a normally closed louvre and a reversible draft promotion device, herein shown as an electric fan.

Referring to the drawings:

Fig. 1 is a front view of the ventilation opening herein in its normal or closed position;

Fig. 2 is a view on an enlarged scale of the rear of the louvre or ventilation opening of Fig. 1;

Fig. 3 is a side view of the device of Figs. 1, 2;

Fig. 4 is a section on the line IV—IV, Fig. 3;

Fig. 5 is a partial section on the line V—V, Fig. 4;

Fig. 6 is a view of the switch on the line VI—VI, Fig. 3;

Fig. 7 is a wiring diagram of the control connections for the motor as pulled to off position;

Fig. 8 is a wiring diagram of the pull after off position, which does not give the starting operation;

Fig. 9 is a view of the next pull from off position which gives the starting operation for the motor, say in clockwise direction; and Fig. 10 is a wiring diagram of the control connection as given an additional control pull for reversing the direction of the fan.

Frame 1 is shown as having box extension 2 rearwardly therefrom. This frame 1 provides ventilation opening 3 having along its vertical sides bearings 4 for rods 5 mounting intermediately their vertical extent, vanes 6 having overlapping portions 7 with each other, and as to the terminal vanes abutting flanges 8. These vanes 6 of the multi-vane louvre are so designed that the upper portions are heavier. Due to each vane having the same area above and below the pivot rod 5, and the upper portion thereof heavier, the vanes 6 will assume a horizontal position regardless of the direction of air travel through the louvre. This is due to the heavier upper portion above the rod 5 offering no more resistance to the air currents than the portion below the rod.

On one side from each of the vanes 6, is ear 9 having pivotal connection 10 with control bar 11 vertically extending along one side of the box 10 rearwardly of the frame 1. From the upper portion of this bar 11 downwardly extends link 12 as having pivotal connection 13 with the bar 11 and pivotal connection 14 with forwardly extending arm 15 fixed with rock bar 16 mounted by bearing 17 as carried by transverse member 18 in the box extension 2 just rearwardly of the vane 6 and bar 11. This rock bar 16, centrally of the extension 2, has upwardly extending short arm 19 carrying abutment or disk 20.

The extension 2 has inwardly extending rear portions 21 leaving a circular opening 22 in which is mounted ring 23, by bolts 24. This ring 23 has inwardly extending flange 24' toward the louvre. This ring 23 has a series of eyes 25 from which extend inwardly springs 26 to arms 27 mounting the motor 28 having shaft 29 mounting disk 30 carrying blades 31 having a pitch with slight concavity and flange terminals 32 as stiffening means.

Adjacent the disk 30 and fixed with the shaft 29 is spider 33 carrying pivot bearings 34 from which extend arms 35 carrying fly weights 36. These arms 35 have pivot bearings 37 for forwardly extending links 38 connected to ears 39 on sleeve 40 extending beyond the terminus of the shaft 29 in housing spring 41. This sleeve 40 is a plunger terminating in head 42 in proximity to the disk 20.

In operation of the motor 28, as directly connected to the draft promotion fan means, at once the shaft 29 starts to rotate and the blades 31 effect circulation of air through the opening 22 the fly weights 36, as speed responsive means, move radially outward effecting compression of the spring 41, thereby withdrawing the plunger head 42 away from the disk 20, with the result that the vanes 6 are allowed to assume their normally open position for a free flow of air through the opening 3 in this ventilation device. At once the motor 28 is stopped, the fly weights 36 move inward and the spring 41 causes the plunger head 42 to act upon the disk 20 in swinging simultaneously the series of vanes 6 into closed position at the opening 3. The vanes are thus normally held in closing position.

In the control of the device hereunder, there is shown handle 43 connected by cord 44 to switch 45 effective for controlling the power connections from supply lines 46, 47, to the motor 28. The line 46 is connected in the switch 45 to terminal 49. Terminals 50, 51, are connected to the motor 28 by line 48 and the motor switch terminals 52, 53, are connected by line 58 to the motor. Terminals 54, 55, are connected by line 59 to the motor, and line 47 goes directly to the motor 28. In the switch, contact pair 56 is disposed as a connector for upper series of terminals 51, 53, 55. Contact pair 57 is disposed for lower series of terminals 49, 50, 52, 54. At one off position (Fig. 7) contact 56 engages terminal 55 and has no terminal contact adjacent 49. The next pull of the cord 44 swings the terminal 56 to the position shown in Figs. 6, 8. This still leaves the contact 56 ineffective as to the terminal 49. The succeeding pull of the cord 44 shifts the contacts 56, 57, to effect the connection as shown in Fig. 9. The contact 57 is the only one effective for connecting with the contact 49, and it may be assumed that in this position of the connections, the motor 28 is driven clockwise say for draft inward through the louvre and back through the fan. The next pull of the cord 44 will bring about the wiring connection as shown in Fig. 10 with a reversal of the motor 28 to effect counterclockwise rotation with draft from the motor 28 forced out through the louvre.

There is, accordingly, provided hereunder a simple automatic control for ventilation say in connection with restaurants, dining rooms, laundries, or places where there is desired control of ventilation either inward or outward with insured closure of the ventilation opening whenever the forced draft is discontinued. The operator is in position definitely to direct the draft, and in the position as shown in Fig. 10, if there be desire to stop, there is only required the single pull which will cut out the motor and have the wiring connections effective for stopping as shown in the diagram Fig. 7.

What is claimed and it is desired to secure by United States Letters Patent is:—

1. A frame providing an opening, a closure for the opening comprising self-opening vanes, and a draft promotion device including means movable relatively to the device and closure for permitting the closure to open only during device operation.

2. A frame providing an opening, a swingable closure for the opening comprising self-opening vanes, and a draft promotion rotary device including speed responsive means movable relatively to the device and closure for permitting the closure to open only during device operation.

3. A frame providing an opening, a one-way swingable closure for the opening comprising self-opening vanes, and a draft promotion reversible rotary device including fly weight means movable relatively to the device and closure for permitting the closure to open only during device operation in either direction.

4. A frame providing an opening, a multi-vane louvre closure for the opening comprising self-opening vanes, a common control connection between the louvre vanes, a rotary fan, and a fly weight device concentric with the fan cooperating with said control connection for normally holding the louvre closed and axially shiftable away from said connection to allow said louvre to open.

5. A frame providing an opening, a multi-vane louvre closure for the opening comprising self-opening vanes, a common control connection between the louvre vanes, a reversible rotary fan, and fly weight means concentric with the fan embodying a plunger normally coacting with said control connection for holding the vanes in closed position and movable upon fan rotation to allow said vanes to move to open position, and a spring resisting shifting of the plunger for holding said vanes in closed position when the fan is idle.

6. A multi-vane louvre comprising self-opening vanes, an electric fan adjacent thereto, and means concentric with the fan normally holding said vanes in closed position and axially shiftable on fan operation out of holding position.

7. A normally self-opening louvre, an electric fan adjacent thereto, a control switch for effecting two directions of fan operations, and a louvre controlling device automatically operable when the fan is idle for effecting louvre closing.

In witness whereof I affix my signature.

LOUIS C. ALBRECHT.